(12) United States Patent
Horii

(10) Patent No.: US 10,320,247 B2
(45) Date of Patent: Jun. 11, 2019

(54) EMBEDDED PERMANENT MAGNET ROTARY ELECTRIC MACHINE

(71) Applicant: Mitsubishi Electric Corporation, Chiyoda-ku, Tokyo (JP)

(72) Inventor: Masaki Horii, Chiyoda-ku (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 552 days.

(21) Appl. No.: 14/045,835

(22) Filed: Oct. 4, 2013

(65) Prior Publication Data
US 2014/0333163 A1 Nov. 13, 2014

(30) Foreign Application Priority Data
May 8, 2013 (JP) .................................. 2013-098112

(51) Int. Cl.
*H02K 1/20* (2006.01)
*H02K 1/32* (2006.01)
(Continued)

(52) U.S. Cl.
CPC ................. *H02K 1/20* (2013.01); *H02K 1/32* (2013.01); *H02K 5/20* (2013.01); *H02K 9/10* (2013.01);
(Continued)

(58) Field of Classification Search
CPC .. H02K 1/20; H02K 1/32; H02K 9/10; H02K 9/06; H02K 5/18; H02K 5/20; H02K 9/18; H02K 9/02; H02K 9/04
(Continued)

(56) References Cited

U.S. PATENT DOCUMENTS 1,551,295 A * 8/1925 Fletcher .................. H02K 9/14
310/57
4,546,279 A * 10/1985 Hammer ................ H02K 3/505
310/260
(Continued)

FOREIGN PATENT DOCUMENTS

JP 54-151810 U 10/1979
JP 11-146585 A 5/1999
(Continued)

OTHER PUBLICATIONS

JP3480800 English Translation.*
(Continued)

*Primary Examiner* — Thomas Truong
*Assistant Examiner* — Alexander Moraza
(74) *Attorney, Agent, or Firm* — Sughrue Mion, PLLC; Richard C. Turner

(57) ABSTRACT

Ventilation apertures are respectively formed circumferentially so as to pass axially through an inner circumferential side of a rotor core, rotor grooves are respectively formed circumferentially on an outer circumferential surface of the rotor core so as to have groove directions in an axial direction, and a centrifugal fan is fixed to the shaft at an end of the rotor core near the front frame, and a cyclic path is formed in which, during operation of the centrifugal fan, cooling air flows into the ventilation apertures from near a rear frame, passes through the ventilation apertures and flows out near the front frame, flows radially outward near the front frame and flows into the rotor grooves, passes through the rotor grooves and flows out near the rear frame, and flows radially inward near the rear frame and flows into the ventilation apertures.

8 Claims, 12 Drawing Sheets

(51) Int. Cl.
- *H02K 5/20* (2006.01)
- *H02K 5/18* (2006.01)
- *H02K 9/06* (2006.01)
- *H02K 9/18* (2006.01)
- *H02K 1/27* (2006.01)
- *H02K 9/10* (2006.01)

(52) U.S. Cl.
CPC ............... *H02K 1/27* (2013.01); *H02K 5/18* (2013.01); *H02K 9/06* (2013.01); *H02K 9/18* (2013.01)

(58) Field of Classification Search
USPC ..... 310/61, 63, 58, 59, 62, 52, 54, 57, 60 R, 310/64
See application file for complete search history.

(56) References Cited

U.S. PATENT DOCUMENTS

| | | | | |
|---|---|---|---|---|
| 5,949,166 | A * | 9/1999 | Ooiwa | H02K 11/046 310/58 |
| 7,569,957 | B2 * | 8/2009 | Aoki | H01L 23/473 310/52 |
| 2004/0112075 | A1 * | 6/2004 | Kachi | B60H 1/00064 62/244 |
| 2007/0284954 | A1 * | 12/2007 | Lin | H02K 11/33 310/58 |
| 2008/0115527 | A1 * | 5/2008 | Doty | F04D 25/0606 62/498 |
| 2008/0193275 | A1 * | 8/2008 | De Filippis | H02K 1/276 415/10 |
| 2011/0169354 | A1 * | 7/2011 | Tsumagari | H02K 1/20 310/62 |

FOREIGN PATENT DOCUMENTS

| | | | |
|---|---|---|---|
| JP | 3480800 B2 | * | 12/2003 |
| JP | 2004-312875 A | | 11/2004 |
| JP | 2007-244177 A | | 9/2007 |
| JP | 2007244177 A | * | 9/2007 |
| JP | 2007-325436 A | | 12/2007 |
| JP | 2009-159763 A | | 7/2009 |
| JP | 2009159763 A | * | 7/2009 |
| JP | 2011-211816 A | | 10/2011 |
| JP | 2011211816 A | * | 10/2011 |
| JP | 2011211862 A | * | 10/2011 |

OTHER PUBLICATIONS

JP2009159763 English Translation.*
JP2007244177 English Translation.*
JP2011211816 English Translation.*
JP 2011211862 A (English translation).*
Japanese Office Action, dated Jul. 1, 2014; Application No. 2013-098112.

* cited by examiner

EMBEDDED PERMANENT MAGNET ROTARY ELECTRIC MACHINE

BACKGROUND OF THE INVENTION

1. Field of the Invention

The present invention relates to an embedded permanent magnet rotary electric machine in which permanent magnets are embedded in an outer circumferential side of a rotor core, and particularly relates to a cooling construction for the permanent magnets that are embedded in the rotor core.

2. Description of the Related Art

Conventional embedded permanent magnet rotary electric machines include: a stator in which a stator coil is applied to a stator core; a rotor that is disposed so as to face the stator core so as to have a gap, and in which a plurality of permanent magnets are disposed circumferentially on a rotor core that is fixed to a shaft; a water cooling apparatus that is disposed on an outer circumferential side of the stator core; and a fan that is fixed to the shaft, and that circulates cooling air inside the machine, wherein a ventilation channel through which cooling air passes is disposed on an outer circumference of the water cooling apparatus, and cooling air that has exchanged heat with the water cooling apparatus inside the ventilation channel is circulated by the fans so as to return to the ventilation channel through the gap between the stator core and the rotor core (see Patent Literature 1, for example).

CITATION LIST

Patent Literature

[Patent Literature 1] Japanese Patent Laid-Open No. 2011-211816 (Gazette)

In conventional embedded permanent magnet rotary electric machines, an outer circumferential surface of the rotor core is a cylindrical surface, and the gap between the stator core and the rotor core is narrow, increasing ventilation resistance. Thus, the volume of cooling air that flows through the gap between the stator core and the rotor core is reduced, and one problem has been that the permanent magnets cannot be cooled effectively.

SUMMARY OF THE INVENTION

The present invention aims to solve the above problems and an object of the present invention is to provide an embedded permanent magnet rotary electric machine that can cool permanent magnets effectively by forming rotor grooves that have a groove direction in an axial direction on an outer circumferential surface of a rotor core to increase a volume of cooling air that flows through a gap between a stator core and the rotor core.

In order to achieve the above object, according to one aspect of the present invention, there is provided an embedded permanent magnet rotary electric machine including: a stator including: an annular stator core; and a stator coil that is wound onto the stator core; a tubular frame inside which the stator core is disposed, and that supports the stator; a first frame and a second frame that each include a bearing, that are disposed at first and second axial ends of the cylindrical frame, and that form a sealed space together with the cylindrical frame; a rotor including: a shaft that is rotatably supported by the bearings; a rotor core that is fixed to the shaft, and is disposed inside the stator core; and a plurality of permanent magnets that are respectively disposed circumferentially so as to be embedded on an outer circumferential side of the rotor core so as to pass axially through the rotor core. In addition, the embedded permanent magnet rotary electric machine includes: a plurality of ventilation apertures that are respectively formed circumferentially so as to pass axially through an inner circumferential side of the rotor core; a plurality of rotor grooves that are respectively formed circumferentially on an outer circumferential surface of the rotor core so as to have groove directions in an axial direction; and an internal fan that is fixed to the shaft at an end of the rotor core near the first frame, wherein a cyclic path is formed in which, during operation of the internal fan, cooling air flows into the ventilation apertures from near the second frame, passes through the ventilation apertures and flows out near the first frame, flows radially outward near the first frame and flows into the rotor grooves, passes through the rotor grooves and flows out near the second frame, and flows radially inward near the second frame and flows into the ventilation apertures.

According to the present invention, rotor grooves are formed on an outer circumferential surface of a rotor core so as to have groove directions in an axial direction. Thus, because a gap between a stator core and the rotor core is wider in rotor groove portions, and ventilation resistance is reduced, the flow rate of cooling air is increased. Because the surface area of the outer circumferential surface of the rotor core is increased, contact area of the rotor core with the cooling air is increased. Performance in cooling the rotor is thereby improved, enabling temperature increases in the permanent magnets to be suppressed.

DETAILED DESCRIPTION OF THE PREFERRED EMBODIMENTS

Preferred embodiments of an embedded permanent magnet rotary electric machine according to the present invention will now be explained with reference to the drawings.

Embodiment 1

Figure 1:
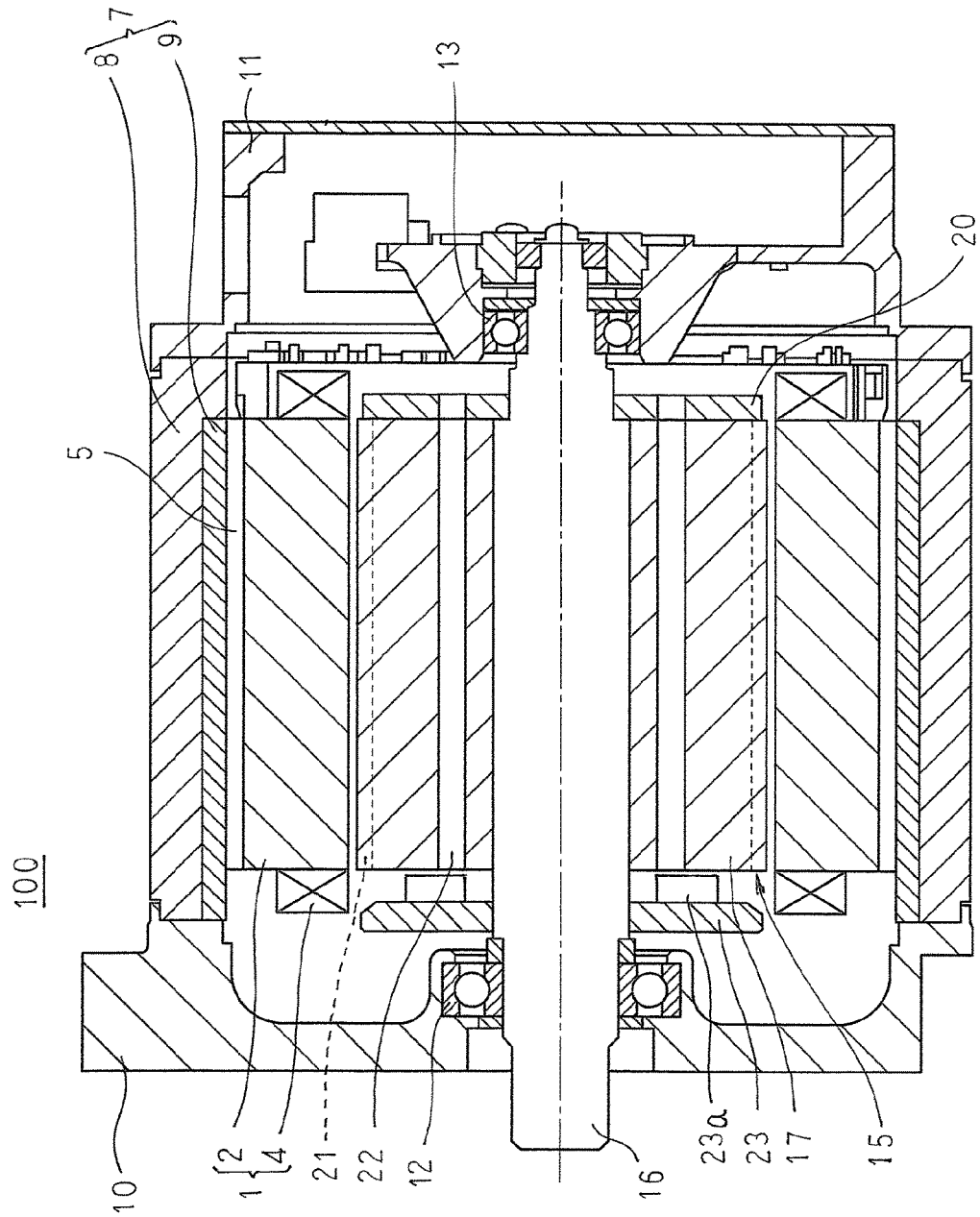
FIG. 1 is a cross section that shows an embedded permanent magnet rotary electric machine according to Embodiment 1 of the present invention.
Figure 2:
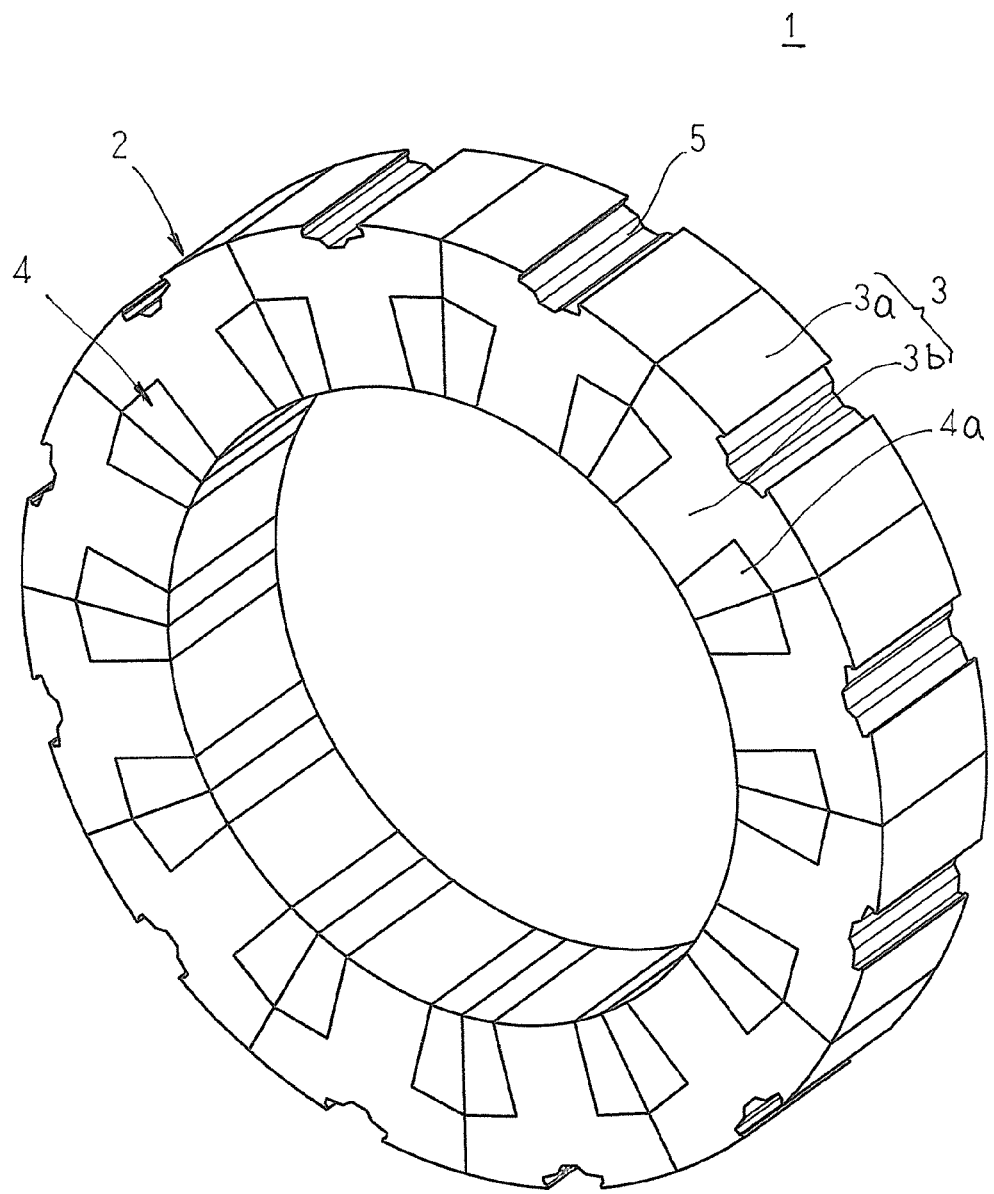
FIG. 2 is a perspective that shows a stator in the embedded permanent magnet rotary electric machine according to Embodiment 1 of the present invention.
Figure 3:
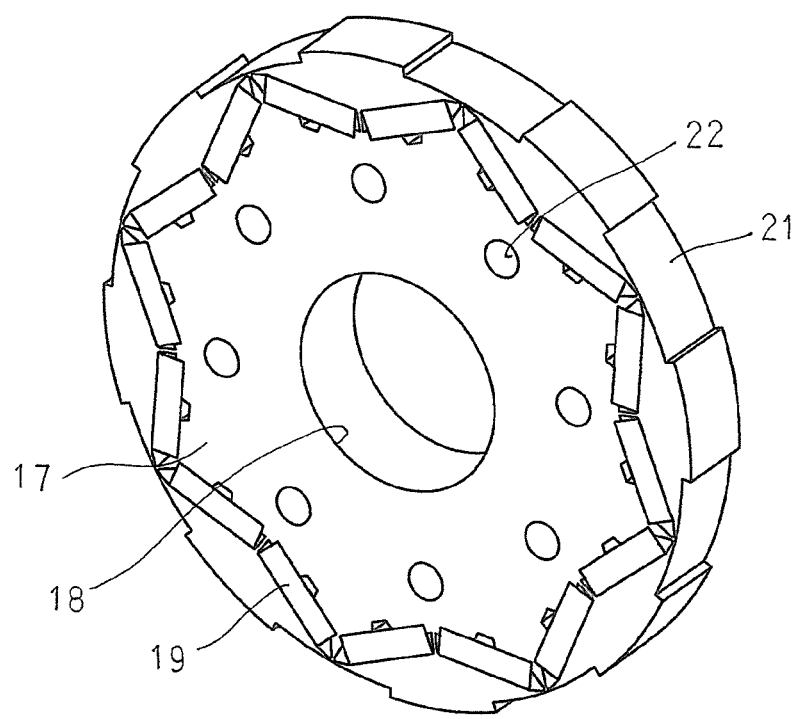
FIG. 3 is a perspective that shows a rotor core in the embedded permanent magnet rotary electric machine according to Embodiment 1 of the present invention.
Figure 4:
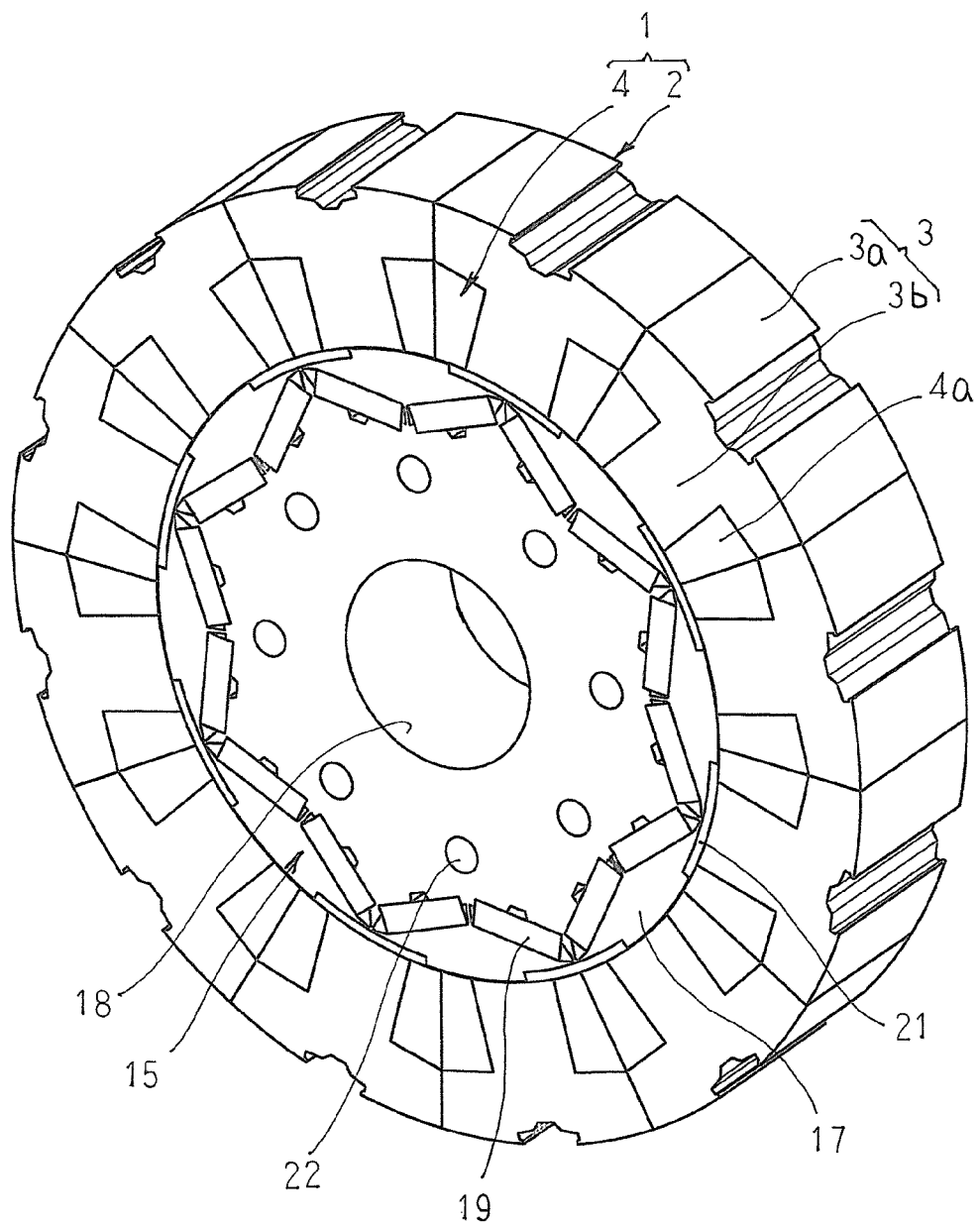
FIG. 4 is a perspective that explains a state in which the rotor core is installed in the stator in the embedded permanent magnet rotary electric machine according to Embodiment 1 of the present invention.
Figure 5:
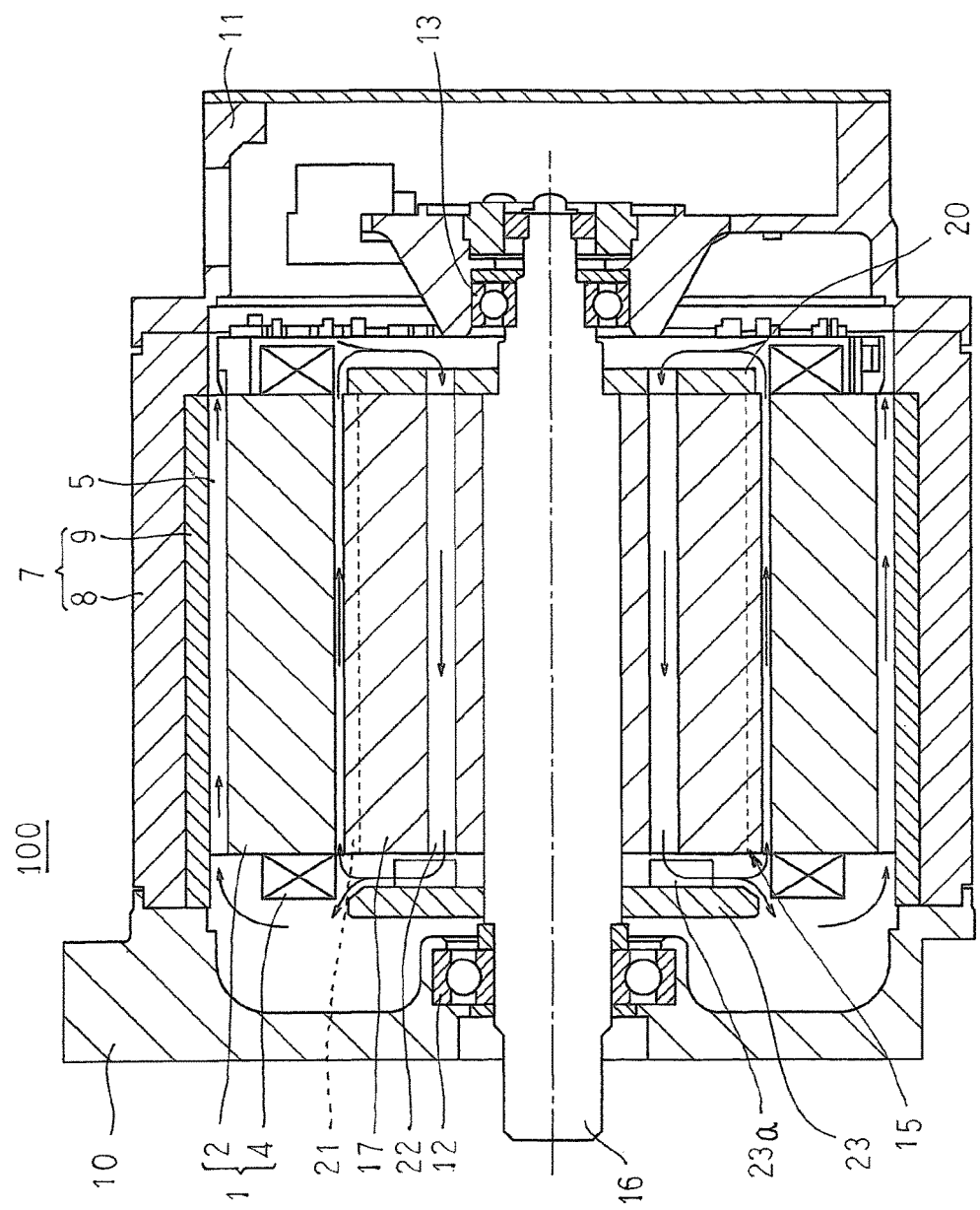
FIG. 5 is a cross section that explains cooling air flow in the embedded permanent magnet rotary electric machine according to Embodiment 1 of the present invention.

FIG. 1 is a cross section that shows an embedded permanent magnet rotary electric machine according to Embodiment 1 of the present invention, FIG. 2 is a perspective that shows a stator in the embedded permanent magnet rotary electric machine according to Embodiment 1 of the present invention, FIG. 3 is a perspective that shows a rotor core in the embedded permanent magnet rotary electric machine according to Embodiment 1 of the present invention, FIG. 4 is a perspective that explains a state in which the rotor core is installed in the stator in the embedded permanent magnet rotary electric machine according to Embodiment 1 of the present invention, and FIG. 5 is a cross section that explains cooling air flow in the embedded permanent magnet rotary electric machine according to Embodiment 1 of the present invention. Moreover, to facilitate explanation, coil ends are omitted in FIGS. 2 and 4. Arrows in FIG. 5 represent air flow.

In FIG. 1, an embedded permanent magnet rotary electric machine 100 includes: an annular stator 1; a cylindrical frame 7 inside which a stator 1 is disposed; a front frame 10 that functions as a first frame and a rear frame 11 that functions as a second frame that respectively include bearings 12 and 13, that are disposed at two axial ends of the cylindrical frame 7, and that together with the cylindrical frame 7 form a sealed space; and a rotor 15 that is rotatably disposed inside the stator 1 so as to be supported by the bearings 12 and 13.

As shown in FIG. 2, the stator 1 has: an annular stator core 2; and a stator coil 4 that is mounted onto the stator core 2. The stator core 2 is constituted by the twelve core blocks 3 that have: a circular arc-shaped core back portion 3a; and a tooth 3b that protrudes radially outward from a circumferentially central position of an inner circumferential surface of the core back portion 3a. A concentrated winding coil 4a that is produced by winding a conductor wire a plurality of times is mounted onto the tooth 3b of each of the core blocks 3. The stator coil 4 is constituted by twelve concentrated winding coils 4a. Stator grooves 5 that have a groove direction in an axial direction are formed at circumferentially central positions on outer circumferential surfaces of the core back portions 3a of the core blocks 3 so as to extend from a first end to a second end in an axial direction of the core back portions 3a.

The cylindrical frame 7 is formed by fitting together and integrating a cylindrical inner frame 9 that is made of aluminum inside a cylindrical outer frame 8 that is made of iron. The twelve core blocks 3 onto which the concentrated winding coil 4a have been mounted are arranged into an annular shape by abutting together circumferential side surfaces of the core back portions 3a, and are pressed into and fixed inside the cylindrical frame 7 to assemble the stator 1.

As shown in FIGS. 1 and 3, the rotor 15 includes: a rotor core 17; a shaft 16 that is press-fitted into and fixed to the shaft insertion aperture 18 that is formed so as to pass through a central axial position of the rotor core 17; sixteen permanent magnets 19 that are each mounted so as to pass through an outer circumferential side of the rotor core 17; and an end plate 20 that is press-fitted onto and fixed to the shaft 16 to prevent dislodging of the rotor core 17 toward a rear end. Eight pairs of circumferentially adjacent permanent magnets 19 are respectively disposed such that different magnetic poles alternate circumferentially. The pairs of permanent magnets 19 are disposed in V shapes that open radially outward.

Eight rotor grooves 21 that have a groove direction in an axial direction are respectively formed on an outer circumferential surface of the rotor core 17 so as to have groove shapes that have an identical rectangular cross section so as to extend from a first axial end to a second end of the rotor core 17, and are arranged in a row at a uniform angular pitch circumferentially. The circumferential centers of these rotor grooves 21 are positioned between adjacent magnetic poles. In addition, eight ventilation apertures 22 are respectively formed so as to pass axially through the rotor core 17 on an outer circumferential side of the shaft insertion aperture 18, and are arranged in a row at a uniform angular pitch circumferentially.

As shown in FIGS. 1 and 4, this rotor 15 is rotatably disposed inside the stator 1 such that the shaft 16 is supported by the bearings 12 and 13. In addition, a centrifugal fan 23 that functions as an internal fan is fixed to the shaft 16 so as to be disposed at an end of the rotor core 17 near the front frame 10. The ventilation apertures 22 are formed on the rotor core 17 so as to face lower ends of blades 23a of the centrifugal fan 23.

An embedded permanent magnet rotary electric machine 100 that is configured in this manner operates as an 8-pole, 12-slot inner-rotor synchronous motor when electricity is supplied to the stator coil 4 from an external electric power supply, for example. The centrifugal fan 23 rotates synchronously with the rotation of the rotor 15, and cooling air circulates through the machine as indicated by the arrows in FIG. 5. Specifically, when the centrifugal fan 23 is driven, cooling air flows into the ventilation apertures 22 from the rear end, passes through the ventilation apertures 22 and flows out at the front end, is deflected radially outward by the centrifugal fan 23, and flows radially outward. Then, a portion of the cooling air that has flowed radially outward flows into the rotor grooves 21, passes through the rotor grooves 21, and flows out at the rear end. A remaining portion of the cooling air that has flowed radially outward flows into the stator grooves 5, passes through the stator grooves 5, and flows out at the rear end. Then, the cooling air that has passed through the stator grooves 5 and flowed out at the rear end merges with the cooling air that has passed through the rotor grooves 21 and flowed out at the rear end, and flows into the ventilation apertures 22.

Figure 6:
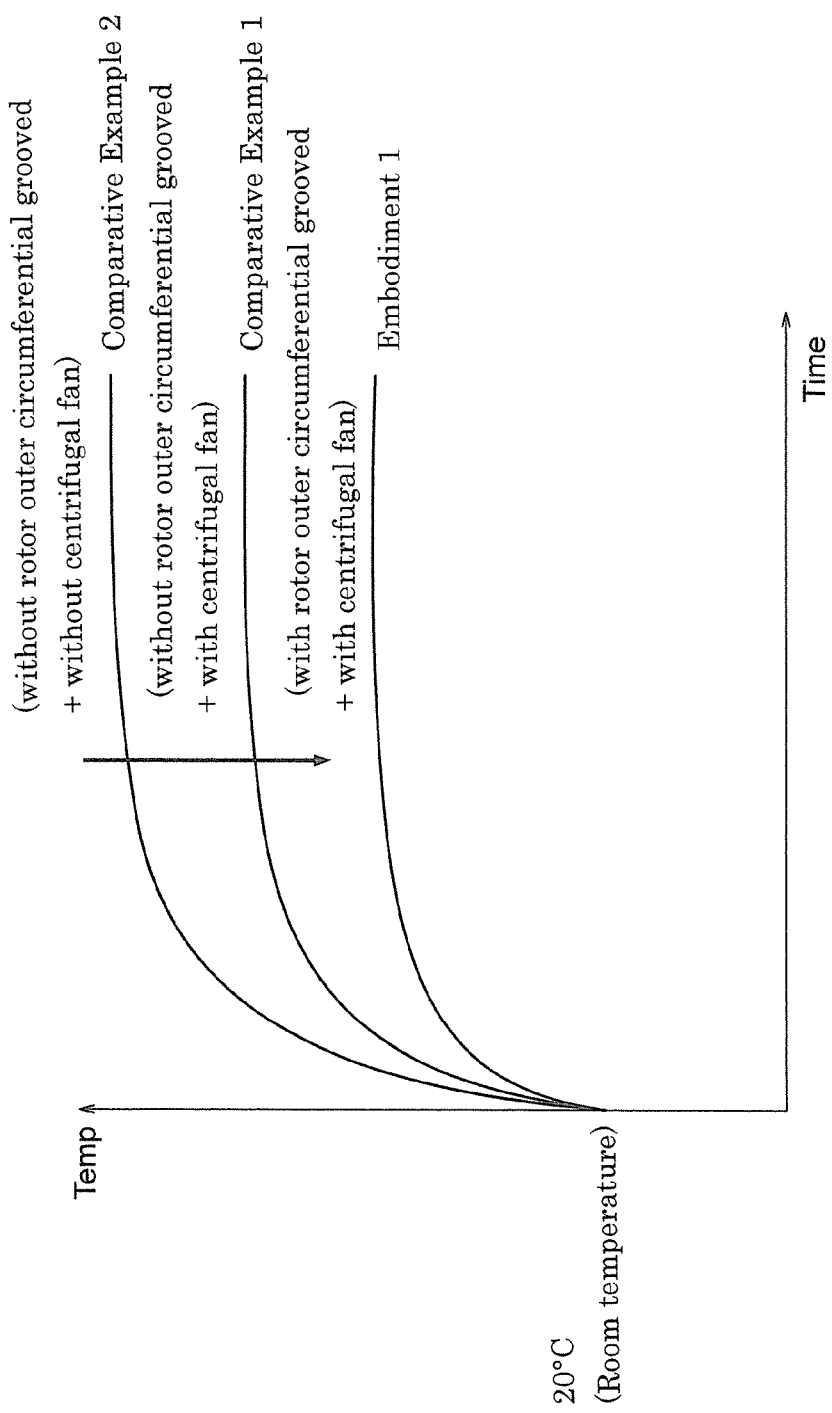
FIG. 6 is a graph that shows relationships between permanent magnet temperature and driving time when an embedded permanent magnet rotary electric machine according to Embodiment 1 of the present invention is driven.

Now, the results of driving an embedded permanent magnet rotary electric machine 100 and measuring temperature changes in the permanent magnets 19 are shown in FIG. 6. FIG. 6 is a graph that shows relationships between permanent magnet temperature and driving time when an embedded permanent magnet rotary electric machine according to Embodiment 1 of the present invention is driven. Moreover, in FIG. 6, Comparative Example 1 represents temperature changes of permanent magnets in an embedded permanent magnet rotary electric machine that uses a rotor core that has a cylindrical surface as an outer circumferential surface instead of the rotor core 17, and Comparative Example 2 represents temperature changes of permanent magnets in an embedded permanent magnet rotary electric machine that uses a rotor core that has a cylindrical surface as an outer circumferential surface instead of the rotor core 17, and from which the centrifugal fan 23 is omitted.

From FIG. 6, it has been possible to confirm that permanent magnet cooling performance increases sequentially in order of the embedded permanent magnet rotary electric machine according to Comparative Example 2, the embedded permanent magnet rotary electric machine according to Comparative Example 1, and the embedded permanent magnet rotary electric machine 100 according to Embodiment 1.

The permanent magnet cooling performance in Comparative Example 1 being higher than the permanent magnet cooling performance by Comparative Example 2 can be inferred to be due to making the cooling air flow forcibly into the gap between the stator core and the rotor core by operating the centrifugal fan 23, because the gap between the stator core and the rotor core is small due to making the outer circumferential surface of the rotor core a cylindrical surface.

The permanent magnet cooling performance by the embedded permanent magnet rotary electric machine 100 according to Embodiment 1 being higher can be inferred to be due to flow channel resistance between the stator core and the rotor core being reduced by forming the rotor grooves 21 on the outer circumferential surface of the rotor core 17, and the flow rate of the cooling air that flows through between the stator core and the rotor core being increased by allowing the cooling air to flow actively through the rotor grooves 21 by operating the centrifugal fan 23.

In Embodiment 1, rotor grooves 21 that have a groove direction in an axial direction are formed on an outer circumferential surface of a rotor core 17. Thus, because a gap between a stator core 2 and the rotor core 17 is wider in portions at the rotor grooves 21, and ventilation resistance is reduced, the flow rate of cooling air is increased. Because the surface area of the outer circumferential surface of the rotor core 17 is increased, contact area of the rotor core 17 with the cooling air increases. Cooling of a rotor 15 is thereby improved, enabling temperature increases in permanent magnets 19 to be suppressed.

In addition, eddy currents are generated during rotation of the rotor 15 due to the radial gap between the stator core 2 and the rotor core 17 changing, enabling a stator 1 and the rotor 15 to be cooled effectively.

Because stator grooves 5 that have a groove direction in an axial direction are formed on an outer circumferential surface of the stator core 2, the cooling air flows through the stator grooves 5 due to operation of a centrifugal fan 23. Thus, heat generated in a stator coil 4 is radiated to the cooling air that flows through the stator grooves 5, suppressing excessive temperature increases in the stator 1.

Embodiment 2

Figure 7:
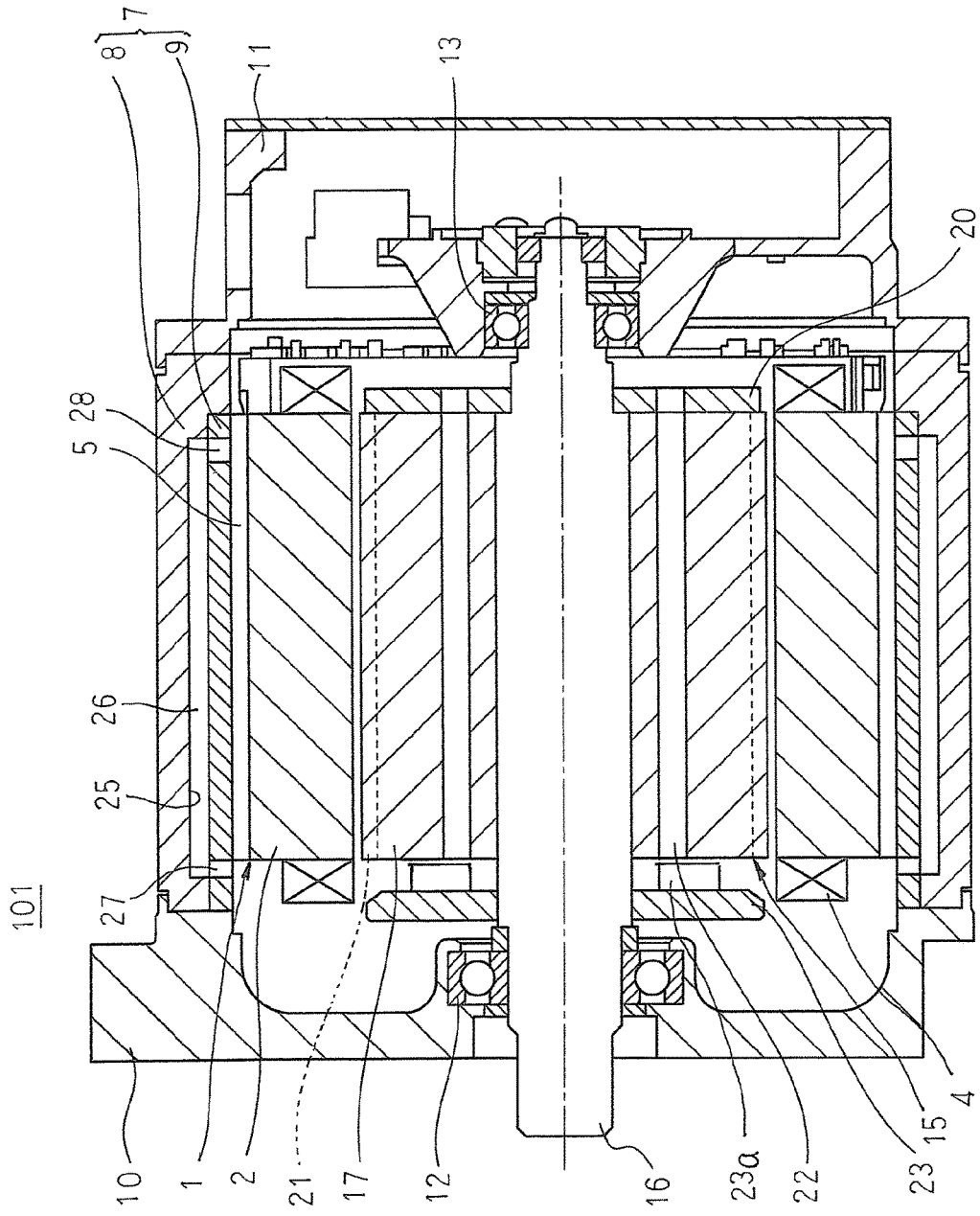
FIG. 7 is a cross section that shows an embedded permanent magnet rotary electric machine according to Embodiment 2 of the present invention.
Figure 8:
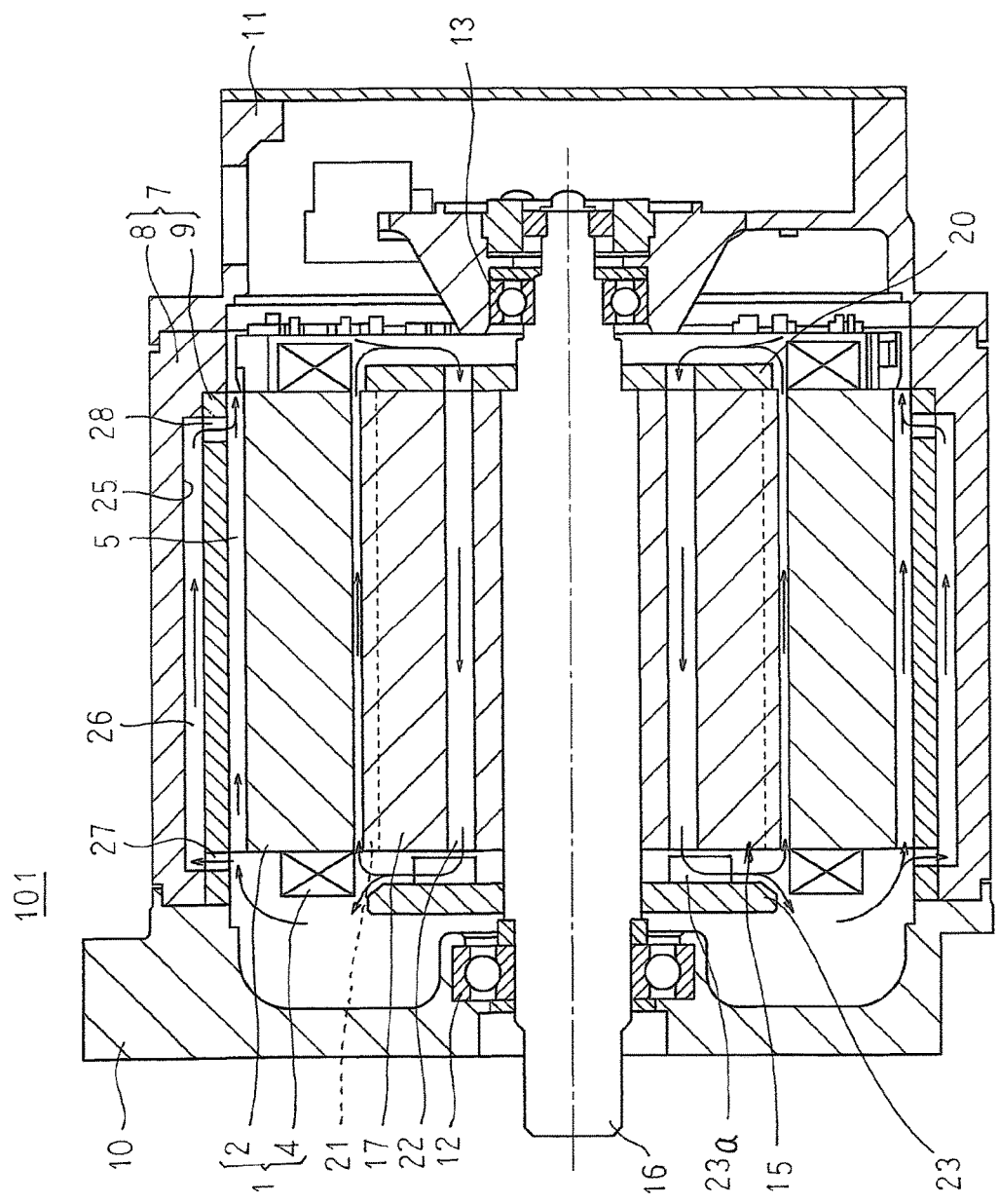
FIG. 8 is a cross section that explains cooling air flow in the embedded permanent magnet rotary electric machine according to Embodiment 2 of the present invention.

FIG. 7 is a cross section that shows an embedded permanent magnet rotary electric machine according to Embodiment 2 of the present invention, and FIG. 8 is a cross section that explains cooling air flow in the embedded permanent magnet rotary electric machine according to Embodiment 2 of the present invention. Moreover, arrows in FIG. 8 represent air flow.

In FIG. 7, a flow channel groove 25 is formed so as to have an axial length that is equal to an axial length of a stator core 2 by recessing an inner circumferential surface of an outer frame 8 over an entire circumference in a circumferential direction so as to be displaced toward a front end relative to the stator core 2. An inner frame 9 is fitted inside and fixed to the outer frame 8 such that a cylindrical air gap portion 26 that is configured so as to cover an opening of the flow channel groove 25 is formed between the outer frame 8 and the inner frame 9. In addition, twelve inflow apertures 27 and twelve outflow aperture 28 are formed on the inner frame 9 at a uniform angular pitch so as to have openings at the front end and the rear end of the cylindrical air gap portion 26. A circumferential position of the stator core 2 is positioned such that the outflow apertures 28 are positioned inside the stator grooves 5, and the stator core 2 is press-fitted inside the cylindrical frame 7.

Moreover, the rest of the configuration is formed in a similar or identical manner to that of Embodiment 1 above.

In an embedded permanent magnet rotary electric machine 101 that is configured in this manner, the centrifugal fan 23 rotates synchronously with the rotation of the rotor 15, and cooling air circulates through the machine as indicated by the arrows in FIG. 8.

Specifically, when the centrifugal fan 23 is driven, cooling air flows into the ventilation apertures 22 from the rear end, passes through the ventilation apertures 22 and flows out at the front end, is deflected radially outward by the centrifugal fan 23, and flows radially outward. Then, a portion of the cooling air that has flowed radially outward flows into the rotor grooves 21, passes through the rotor grooves 21, and flows out at the rear end. A portion of a remaining portion of the cooling air that has flowed radially outward flows into the stator grooves 5, passes through the stator grooves 5, and flows out at the rear end. In addition, a remaining portion of the cooling air that has flowed radially outward flows in through the inflow apertures 27 into the air gap portion 26, passes through the air gap portion 26, and flows out through the outflow apertures 28 into the stator grooves 5. Then, the cooling air that has flowed out from the outflow apertures 28 merges with the cooling air that flows through the stator grooves 5, and flows out at the rear end. The cooling air that has flowed out from the stator grooves 5 merges with the cooling air that has passed through the rotor grooves 21 and flowed out at the rear end, and flows into the ventilation apertures 22.

Consequently, similar or identical effects to those of Embodiment 1 above can also be achieved in Embodiment 2.

In Embodiment 2, because an air gap portion 26 that is a cooling air ventilation channel is formed inside a cylindrical frame 7, and a large outer circumferential surface of the cylindrical frame 7 (outer frame 8) becomes a radiating surface, heat that is stored in the cooling air is transmitted to the cylindrical frame 7 (the outer frame 8), and is radiated to external air. Thus, because cooled cooling air is returned to a rear end of a rotor 15, and is supplied for cooling of a stator 1 and the rotor 15, the stator 1 and the rotor 15 can be cooled effectively.

Moreover, in Embodiment 2 above, the air gap portion 26 inside the cylindrical frame 7 is formed so as to have an axial length that is equal to that of the stator core 2, but the axial length of the air gap portion 26 may also be made longer than the axial length of the stator core 2, and inflow apertures 27 and outflow apertures 28 positioned axially outside the stator core 2.

In Embodiment 2 above, the air gap portion 26 inside the cylindrical frame 7 is formed so as to have a cylindrical shape that surrounds the stator core 2, but a plurality of air gap portions may also each be formed in a straight line so as to communicate between the corresponding inflow apertures and outflow apertures, and be arranged so as to be separated in a circumferential direction.

Embodiment 3

Figure 9:
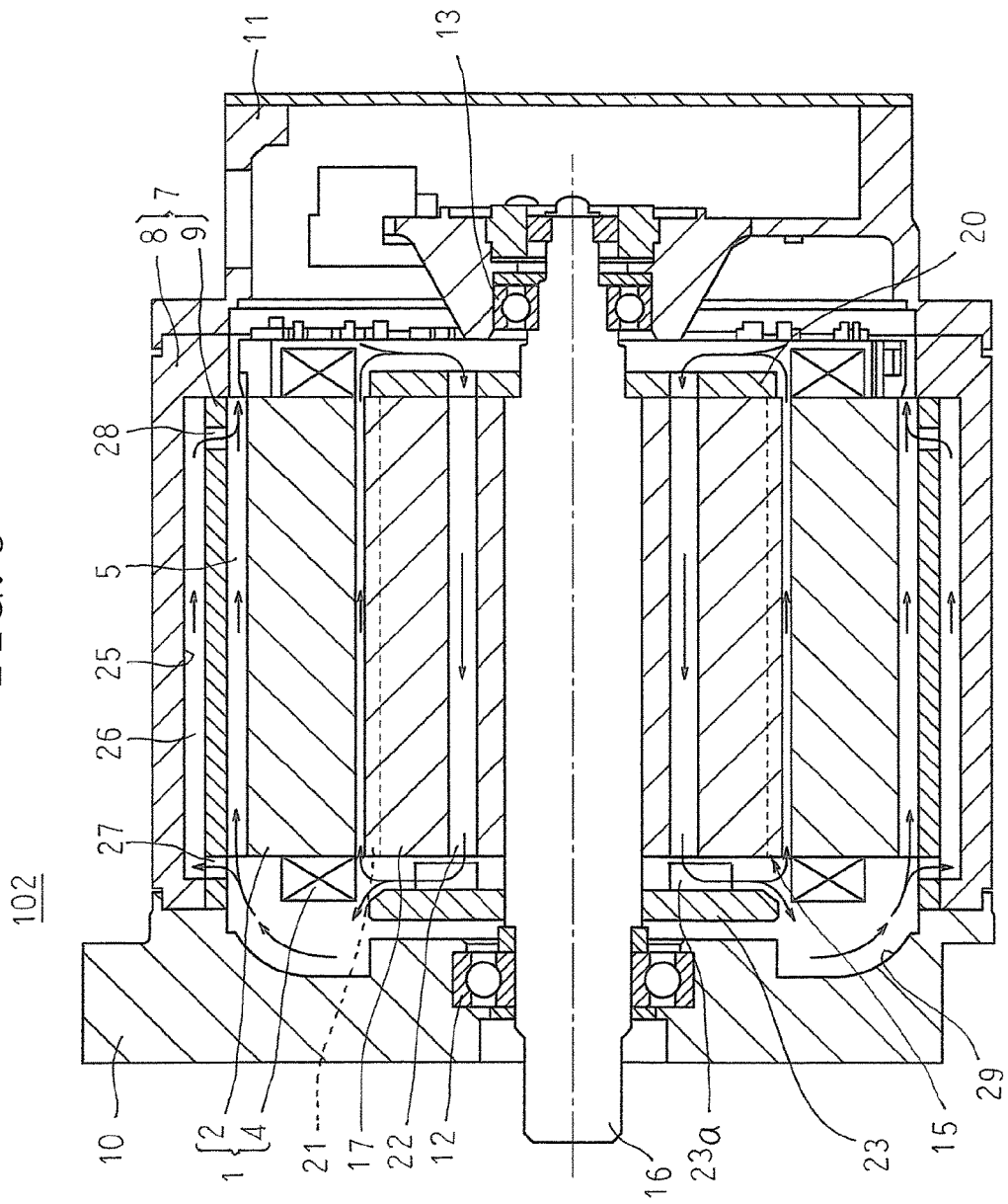
FIG. 9 is a cross section that shows an embedded permanent magnet rotary electric machine according to Embodiment 3 of the present invention.

FIG. 9 is a cross section that shows an embedded permanent magnet rotary electric machine according to Embodiment 3 of the present invention. Moreover, arrows in FIG. 9 represent air flow.

In FIG. 9, a cooling air guiding portion 29 is formed in a region of an inner wall surface of a front frame 10 that extends from radially outside a centrifugal fan 23 to a cylindrical frame 7. This cooling air guiding portion 29 is formed by curving an inner wall surface of the front frame 10 into an arc shape such that an axial distance between the inner wall surface of the front frame 10 and the cylindrical frame 7 becomes gradually shorter toward a radially outer side from radially outside the centrifugal fan 23.

Moreover, the rest of the configuration is formed in a similar or identical manner to that of Embodiment 2 above.

In an embedded permanent magnet rotary electric machine 102 that is configured in this manner, the centrifugal fan 23 rotates synchronously with the rotation of the rotor 15, and cooling air circulates through the machine as indicated by the arrows in FIG. 9. Here, cooling air that has been made to flow radially outward by the centrifugal fan 23 flows smoothly along the curved wall surface of the cooling air guiding portion 29 toward the cylindrical frame 7, and flows into the stator grooves 5 and the inflow apertures 27. Thus, the cycling of the cooling air inside the machine becomes smooth.

Consequently, according to Embodiment 3, because the cycling of the cooling air inside the machine becomes smooth, performance in cooling the stator 1 and the rotor 15 is further increased.

Moreover, in Embodiment 3 above, the air gap portion 26 inside the cylindrical frame 7 is formed so as to have a cylindrical shape that surrounds the stator core 2, but a plurality of air gap portions may also each be formed in a straight line so as to communicate between the corresponding inflow apertures and outflow apertures, and be arranged so as to be separated in a circumferential direction.

Embodiment 4

Figure 10:
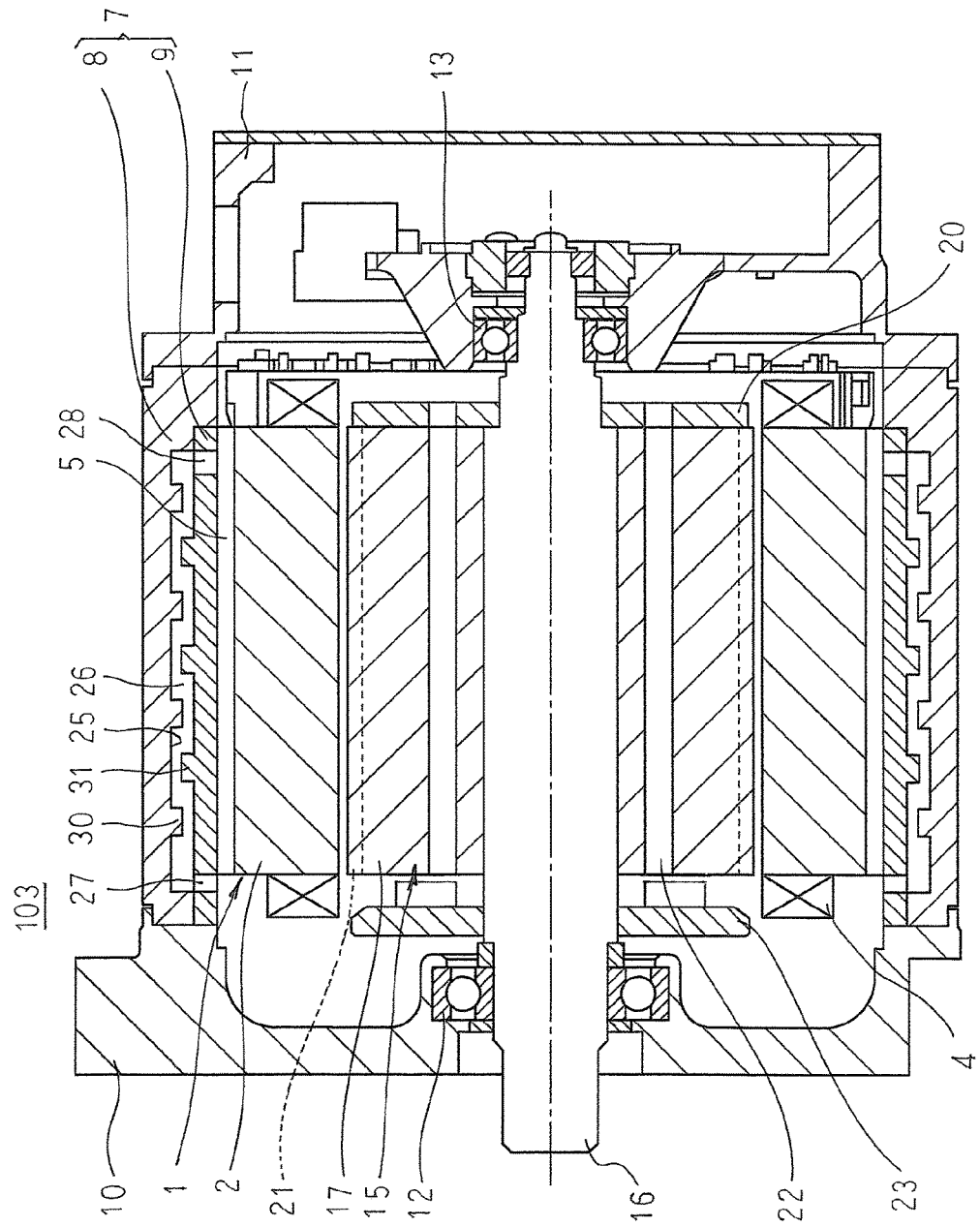
FIG. 10 is a cross section that shows an embedded permanent magnet rotary electric machine according to Embodiment 4 of the present invention.

FIG. 10 is a cross section that shows an embedded permanent magnet rotary electric machine according to Embodiment 4 of the present invention.

In FIG. 10, a plurality of projections 30 are each formed so as to protrude radially inward from a bottom surface of a flow channel groove 25 on an outer frame 8 in a circumferentially encompassing annular shape, and are arranged in a row axially. A plurality of projections 31 are each formed so as to protrude radially outward from an outer circumferential surface of an inner frame 9 in a circumferentially encompassing annular shape, and are arranged in a row axially. The projections 30 and 31 are arranged in a row so as to alternate axially on an external wall surface and an internal wall surface of an air gap portion 26.

Moreover, the rest of the configuration is formed in a similar or identical manner to that of Embodiment 2 above.

In an embedded permanent magnet rotary electric machine 103 that is configured in this manner, the centrifugal fan 23 rotates synchronously with the rotation of the rotor 15, and cooling air circulates through the machine in a similar or identical manner to that of Embodiment 2 above. Here, as the cooling air that has flowed into the air gap portion 26 through the inflow apertures 27 flows axially through the air gap portion 26, it collides with the projections 30 and 31 and forms eddy currents, lengthening dwell time inside the air gap portion 26.

Consequently, according to Embodiment 4, because the dwell time of the cooling air inside the air gap portion 26 is lengthened, the amount of heat stored in the cooling air that is radiated to external air by means of the outer frame 8 increases. Thus, the temperature of the cooling air that is returned to the rear end of the rotor 15 is reduced, enabling performance in cooling the stator 1 and the rotor 15 to be further increased.

Moreover, in Embodiment 4 above, the air gap portion 26 inside the cylindrical frame 7 is formed so as to have a cylindrical shape that surrounds the stator core 2, but a plurality of air gap portions may also each be formed in a straight line so as to communicate between the corresponding inflow apertures and outflow apertures, and be arranged so as to be separated in a circumferential direction.

Embodiment 5

Figure 11:
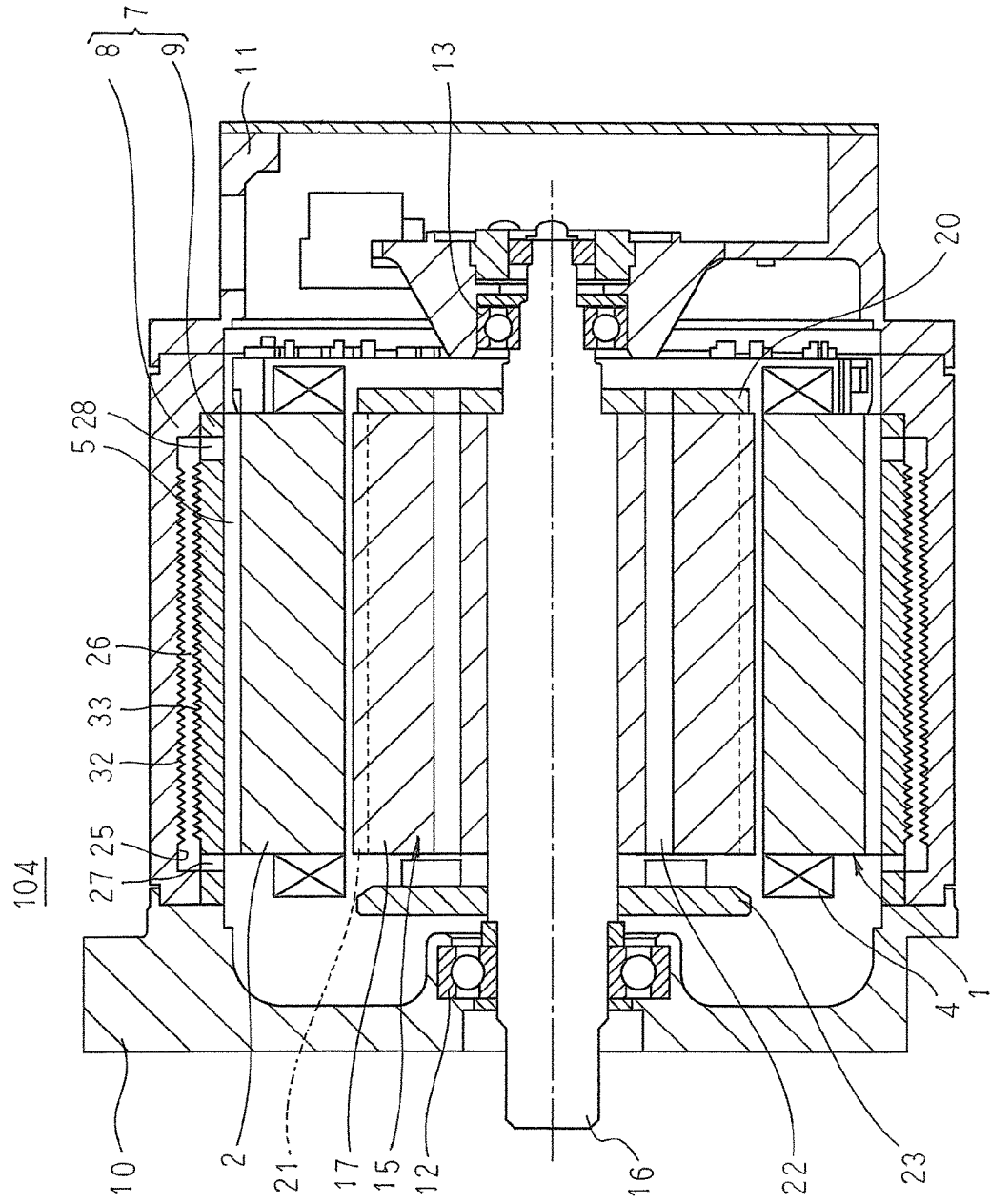
FIG. 11 is a cross section that shows an embedded permanent magnet rotary electric machine according to Embodiment 5 of the present invention.

FIG. 11 is a cross section that shows an embedded permanent magnet rotary electric machine according to Embodiment 5 of the present invention.

In FIG. 11, a helical groove 32 is formed on a bottom surface of a flow channel groove 25 of an outer frame 8 so as to have a helical shape such that its axial position displaces gradually rearward as its circumferential position changes. A helical groove 33 is formed on an outer circumferential surface of an inner frame 9 so as to have a helical shape such that its axial position displaces gradually rearward as its circumferential position changes. The helical grooves 32 and 33 are formed on an external wall surface and an internal wall surface of an air gap portion 26 such that the winding direction of the grooves are aligned so as to face each other.

Moreover, the rest of the configuration is formed in a similar or identical manner to that of Embodiment 2 above.

In an embedded permanent magnet rotary electric machine 104 that is configured in this manner, the centrifugal fan 23 rotates synchronously with the rotation of the rotor 15, and cooling air circulates through the machine in a similar or identical manner to that of Embodiment 2 above. Here, the cooling air that has flowed into the air gap portion 26 through the inflow apertures 27 flows helically through the air gap portion 26 due to the helical grooves 32 and 33, lengthening dwell time inside the air gap portion 26.

Consequently, according to Embodiment 5, because the dwell time of the cooling air inside the air gap portion 26 is lengthened, the amount of heat stored in the cooling air that is radiated to external air by means of the outer frame 8 increases. Thus, the temperature of the cooling air that is returned to the rear end of the rotor 15 is reduced, enabling performance in cooling the stator 1 and the rotor 15 to be further increased.

Embodiment 6

Figure 12:
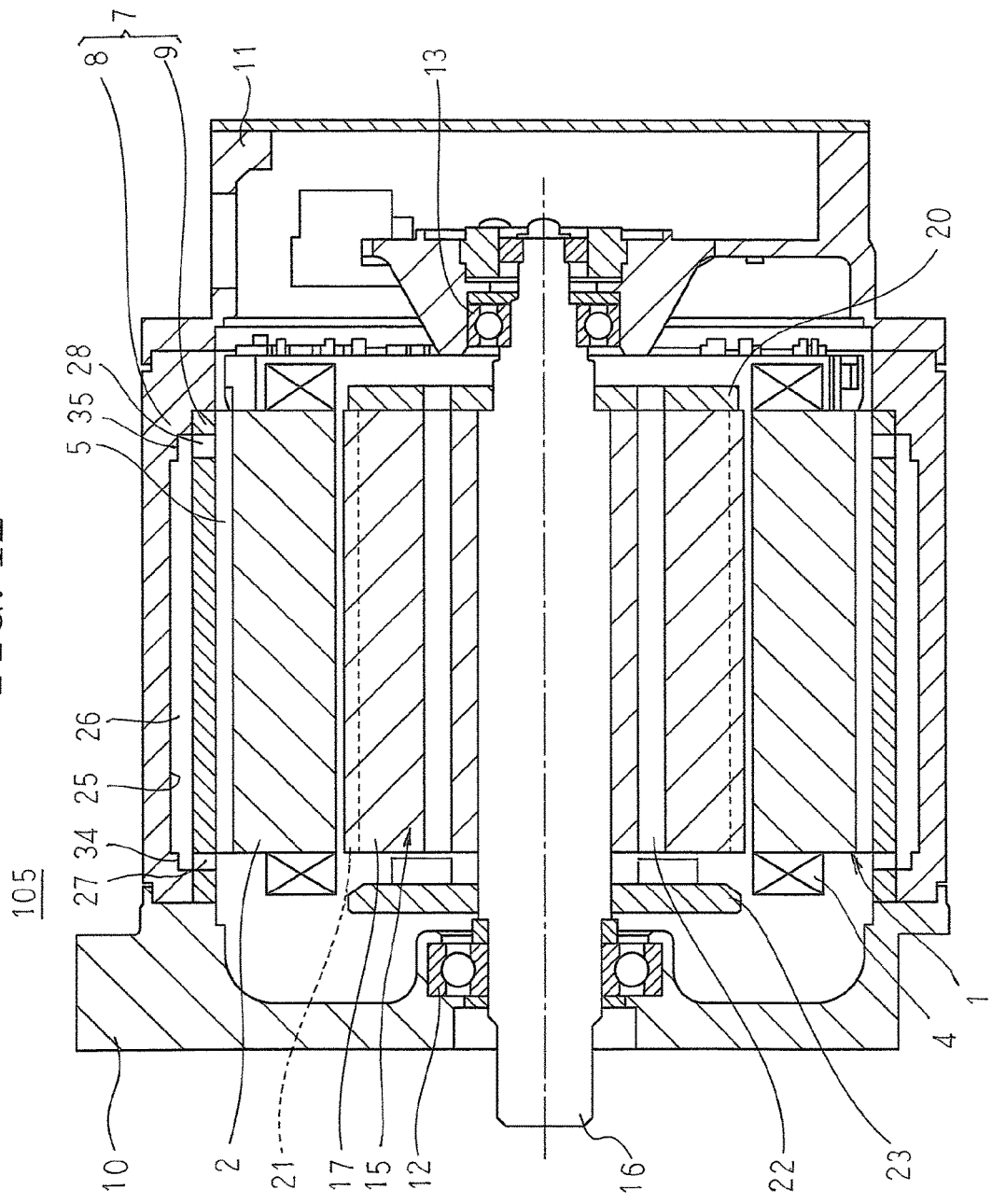
FIG. 12 is a cross section that shows an embedded permanent magnet rotary electric machine according to Embodiment 6 of the present invention.

FIG. 12 is a cross section that shows an embedded permanent magnet rotary electric machine according to Embodiment 6 of the present invention.

In FIG. 12, a step 34 is formed so as to protrude radially inward from a front end of a bottom surface of a flow channel groove 25 of an outer frame 8 so as to have a circumferentially encompassing annular shape, and a step 35 is formed so as to protrude radially inward from a rear end of the bottom surface of the flow channel groove 25 of the outer frame 8 so as to have a circumferentially encompassing annular shape. The steps 34 and 35 face inflow apertures 27 and outflow apertures 28, and constrict a cooling air inflow portion and a cooling air outflow portion of the air gap portion 26.

Moreover, the rest of the configuration is formed in a similar or identical manner to that of Embodiment 2 above.

In an embedded permanent magnet rotary electric machine 105 that is configured in this manner, the centrifugal fan 23 rotates synchronously with the rotation of the rotor 15, and cooling air circulates through the machine in a similar or identical manner to that of Embodiment 2 above. Here, because the cooling air inflow portion of the air gap portion 26 is constricted by the step 34, the cooling air forms eddy currents as it flows into the air gap portion 26 from the inflow apertures 27, and because the cooling air outflow portion of the air gap portion 26 is constricted by the step 35, it is harder for the cooling air to flow out of the air gap portion 26, lengthening dwell time inside the air gap portion 26.

Consequently, according to Embodiment 6, because the dwell time of the cooling air inside the air gap portion 26 is lengthened, the amount of heat stored in the cooling air that is radiated to external air by means of the outer frame 8 increases. Thus, the temperature of the cooling air that is returned to the rear end of the rotor 15 is reduced, enabling performance in cooling the stator 1 and the rotor 15 to be further increased.

Moreover, in Embodiment 6 above, the steps 34 and 35 are formed on the bottom surface of the flow channel groove 25 of the outer frame 8 so as to have annular shapes, but it is not necessary for the steps 34 and 35 to be formed so as to have annular shapes, provided that steps are formed on regions that respectively face the inflow apertures 27 and the outflow apertures 28.

In Embodiment 6 above, the air gap portion 26 inside the cylindrical frame 7 is formed so as to have a cylindrical shape that surrounds the stator core 2, but a plurality of air gap portions may also be respectively formed in straight lines so as to communicate between corresponding inflow apertures and outflow apertures, and arranged so as to be separated in a circumferential direction.

In each of the above embodiments, a centrifugal fan is fixed a shaft at a front end of a rotor core, but a centrifugal fan may also be fixed to the shaft at a rear end of the rotor core. In that case, cooling air flows through ventilation apertures from the front end toward the rear end, and flows through rotor grooves from the rear end toward the front end.

In each of the above embodiments, an 8-pole, 12-slot rotary electric machine has been explained, but it goes without saying that the number of poles and the number of slots are not limited to eight poles and twelve slots.

In each of the above embodiments, pairs of permanent magnets that constitute magnetic poles are disposed in V shapes that open radially outward from a central axis, but arrangement of the permanent magnets is not limited thereto. For example, the respective permanent magnets may also be disposed at a uniform angular pitch circumferentially such that the permanent magnets contact an identical cylindrical surface to constitute magnetic poles.

What is claimed is:

1. An embedded permanent magnet rotary electric machine comprising:
    a stator comprising:
        an annular stator core; and
        a stator coil that is wound onto said stator core;
    a cylindrical frame inside which said stator core is disposed, and that supports said stator;
    a first frame and a second frame that each comprise a bearing, that are disposed at first and second axial ends of said cylindrical frame, and that form a sealed space together with said cylindrical frame;
    a rotor comprising:
        a shaft that is rotatably supported by said bearings;
        a rotor core that is fixed to said shaft, and that is disposed inside said stator core; and
        a plurality of permanent magnets that are respectively disposed circumferentially so as to be embedded on an outer circumferential side of said rotor core so as to pass axially through said rotor core,
    said embedded permanent magnet rotary electric machine further comprising:
    a plurality of ventilation apertures that are respectively formed circumferentially so as to pass axially through an inner circumferential side of said rotor core;
    a plurality of rotor grooves that are respectively formed circumferentially on an outer circumferential surface of said rotor core so as to have groove directions in an axial direction;
    an internal fan that is fixed to said shaft at an end of said rotor core near said first frame,
    an inflow aperture that is formed on said cylindrical frame so as to have an opening near said first frame of said stator core;
    an outflow aperture that is formed on said cylindrical frame so as to have an opening near said second frame of said stator core; and
    an air gap portion that is formed inside said cylindrical frame so as to communicate between said inflow aperture and said outflow aperture,
    wherein the internal fan is configured to form a cyclic path in which, during operation of said internal fan, cooling air flows into said ventilation apertures from near said second frame, passes through said ventilation apertures toward said first frame and flows out near said first frame, flows radially outward near said first frame and flows into said rotor grooves, passes through said rotor grooves toward said second frame and flows out near said second frame, and flows radially inward near said second frame and flows into said ventilation apertures toward said first frame;
    wherein, during operation of said internal fan, a portion of said cooling air that has flowed radially outward near said first frame flows into said air gap portion through said inflow aperture, flows through said air gap portion, flows out through said outflow aperture, and merges with cooling air that has passed through said rotor grooves and flowed out near said second frame; and
    wherein steps are formed so as to project from axially outermost regions of a wall surface of said air gap portion that face said inflow aperture and said outflow aperture.

2. An embedded permanent magnet rotary electric machine according to claim 1, wherein a projection is formed on a wall surface of said air gap portion.

3. An embedded permanent magnet rotary electric machine according to claim 2, wherein a gap is formed radially inward or radially outward of the projection formed on the wall surface of said air gap portion to permit air flow in an axial direction.

4. An embedded permanent magnet rotary electric machine according to claim 1, wherein:
   said air gap portion is formed into a cylindrical shape that surrounds said stator core; and
   a helical groove is formed on at least one of an inner circumferential surface and an outer circumferential surface of said air gap portion.

5. An embedded permanent magnet rotary electric machine according to claim 1, wherein a cooling air guiding portion is formed on a region of an inner wall surface of said first frame that extends from radially outside said internal fan to said cylindrical frame so as to be curved radially outward into an arc shape that gradually approaches said cylindrical frame.

6. An embedded permanent magnet rotary electric machine according to claim 5, wherein a projection is formed on a wall surface of said air gap portion.

7. An embedded permanent magnet rotary electric machine according to claim 5, wherein:
   said air gap portion is formed into a cylindrical shape that surrounds said stator core; and
   a helical groove is formed on at least one of an inner circumferential surface and an outer circumferential surface of said air gap portion.

8. An embedded permanent magnet rotary electric machine according to claim 1, wherein a plurality of stator grooves that are respectively formed circumferentially on an outer circumferential surface of said stator core so as to have groove directions in an axial direction.

\* \* \* \* \*